United States Patent [19]

Best

[11] Patent Number: 5,405,894
[45] Date of Patent: Apr. 11, 1995

[54] COATING COMPOSITIONS

[75] Inventor: Robert D. M. Best, Redcar, United Kingdom

[73] Assignee: Exxon Chemical Patents Inc., Linden, N.J.

[21] Appl. No.: 78,196

[22] PCT Filed: Dec. 16, 1991

[86] PCT No.: PCT/EP91/02445
§ 371 Date: Jun. 17, 1993
§ 102(e) Date: Jun. 17, 1993

[87] PCT Pub. No.: WO92/11316
PCT Pub. Date: Jul. 9, 1992

[30] Foreign Application Priority Data

Dec. 18, 1990 [GB] United Kingdom ............... 9027371

[51] Int. Cl.$^6$ .................... C08K 5/42; C08K 5/01; C08K 3/34; C08L 93/04
[52] U.S. Cl. .................... 524/166; 524/274; 524/447; 524/486; 524/495; 524/496; 524/505; 524/575; 525/71; 428/457; 428/461; 428/462; 428/521
[58] Field of Search ............... 524/166, 274, 486, 505, 524/161, 575, 447, 496, 495; 525/71; 428/457, 461, 462, 521

[56] References Cited

U.S. PATENT DOCUMENTS

| | | | |
|---|---|---|---|
| 4,631,083 | 12/1986 | Christhilf et al. | 524/166 |
| 4,659,776 | 4/1987 | Russel | 525/71 |
| 4,729,791 | 3/1988 | Laura et al. | 524/166 |
| 5,283,276 | 2/1994 | Best et al. | 524/166 |

FOREIGN PATENT DOCUMENTS

| | | | |
|---|---|---|---|
| 0043968 | 2/1988 | Japan | 524/166 |
| 0210473 | 8/1989 | Japan | 524/166 |

*Primary Examiner*—Peter Szekely
*Attorney, Agent, or Firm*—Vivienne T. White

[57] ABSTRACT

A corrosion protection composition comprising a thermoplastic elastomeric block copolymer, a colloidal size amorphous overbased sulphonate of an alkaline earth metal, a tackifier resin and optionally a plasticizer for the block copolymer.

23 Claims, No Drawings

COATING COMPOSITIONS

The present invention relates to compositions and their use as coating materials particularly for the undercoating of motor vehicles to prevent chipping and corrosion.

Automobile undercoatings typically consist of several layers on a metal, usually phosphorized metal. First the phosphorized metal is painted, it is subsequently coated with a layer of a polyvinyl chloride plastisol, generally applied as a dispersion, which is fused to provide a rendered chip resistant coating. Frequently the plastisol is filled with a substantial amount of filler, typically calcium carbonate. Once the polyvinyl chloride layer is applied and fused it may itself be coated with a layer of wax to inhibit decomposition of the polyvinyl chloride and consequential corrosion. There may also be incorporated an anticorrosion material which may include a thixotropic calcium sulphonate, but the sulphonate cannot be incorporated into the polyvinyl chloride because of the incompatibility of the plasticizer of the plastisol with large quantities of oil, which are normally present in the calcium sulphonate materials.

These coating systems are complex and furthermore there is a desire to replace the polyvinyl chloride to avoid toxicological problems in the disposal of vehicles by combustion. The polyvinyl chloride layer furthermore provides very limited anticorrosion properties and its flexibility under changing temperature and stress conditions can be unsatisfactory.

Various alternative coating compositions have been tried but have not proved satisfactory since they do not satisfy one or more of the requirements, particularly the ability to be applied as a solution or dispersion which can give a coating with sufficient adhesion to metal, which does not sag and which has sufficient temperature and stress endurance. It is also desirable to have a coating that can be applied at a high solids level by the preferred spraying techniques at ambient temperature so reducing the amount of solvent used and facilitating its removal. Furthermore, it would be highly desirable to have a single treatment which provides both anticorrosion and chip resistance to the underside of the vehicle. Still further, it would be of advantage if the coating could be disposed of, when the vehicle is scrapped, without harming the environment.

Numerous coating compositions have been proposed, many of which have been used commercially, for the coating of ferrous and non-ferrous metals susceptible to rust or corrosion, to prevent or inhibit such rust or corrosion. As has long been known, rust or corrosion is caused by environmental conditions, such as contact of the metal surfaces with water and oxygen; by air, particularly moist air and by various chemicals or other materials which come into contact with the metal surfaces.

While, in most cases, ferrous metals such as iron and steels represent the areas where rust and corrosion problems are particularly encountered, various non-ferrous metals, for instance, aluminium, are also subject to corrosion.

The use of corrosion-inhibiting coating compositions, which contain thixotropic, or grease-like or gel-like thixotropic, alkaline earth metal organic sulphonates complexed with alkaline earth metal carbonates, with or without admixture with polymers, resins or waxes, in a carrier or diluent of nonvolatile or volatile (or mixtures of nonvolatile and volatile) hydrocarbons and/or other liquid solvents, is disclosed in U.S. Pat. Nos. 3,453,124; 3,492,231; 3,565,672; 3,565,843; 3,661,662; 3,746,643; and 3,816,310; and United Kingdom Patent No. 1,249,144 and various patents referred to in the specifications of such patents. Various of such corrosion-inhibiting compositions are proposed for a variety of purposes, some including automobile and truck body undercoatings, and others for use in other environments.

There are numerous other proposals for compositions for vehicle underbody coatings. In JP-A-1-247439 a composition comprising a styrene-olefin elastomer, a fat-based plasticizer and a hydrocarbon-based plasticizer is described, optionally blended with an organic solvent, an "organic coating" component and an inorganic filler. As examples of the organic coating component are mentioned petroleum waxes and metal sulphonates, and talc, calcium carbonate, and carbon black are given as examples of inorganic fillers.

JP-A-1-210473 describes an anti-corrosive paint composition comprising a styrene-butadiene-styrene (hereinafter SBS) block copolymer, a second binder, a metal sulphonate, and a metal salt of a petrolatum oxide or lanolin. JP-A-59-043075 describes a similar composition, but with a styrene-ethylene-butylene-styrene (hereinafter SEBS) copolymer.

JP-A-1-094984 describes the use of an anti-corrosive composition comprising a thixotropic basic calcium alkylbenzenesulphonate, a wax, and a modified alkyd resin to fill internal apertures in car bodies.

JP-A-63-61060 describes corrosion protection using a UV-curable hot melt coating composition comprising an SBS, SEBS, or styrene-isobutylene-styrene (SIS) block copolymer with a photopolymerizable functional group, a tackifier resin, a metal sulphonate, and a photoinitiator.

In W088/01286, a sag-resistant anti-corrosion coating is described, which is a non-Newtonian colloidal disperse system, comprising a hydrogenated block copolymer, e.g., an SBS block copolymer, and an overbased metal sulfonate.

In W086/02372 a polymer blend having improved environmental stress crack resistance is described, the composition comprising a polyphenylene ether, a polyvinyl aromatic compound, a block copolymer, e.g., an SBS block copolymer, and an alkali or alkaline earth metal sulphonate.

Existing commercially available corrosion resistant coating compositions are capable of providing good protection to metal surfaces against corrosion and chipping under normal use conditions but there are increasing demands from automobile manufacturers to provide coatings capable of affording protection at very low temperatures, for example, at −40° C., and the requirements at all temperatures have become more severe.

The need remains, therefore, for a coating composition giving improved corrosion protection and/or protection against accidental damage, for example chipping, at normal and/or low temperatures.

The composition should retain the ability to produce a finished coating that affords adequate corrosion protection, with satisfactory adhesion to the metal to which it is to be applied, water and chemical resistance, and absence of sagging or dripping at elevated temperatures. Further the composition should be capable of being formulated as a hard, paint-like, coating, an elastomeric coating, or a soft coating, e.g., the waxy coatings applied to internal surfaces of motor vehicles.

The present invention is based on the observation that a composition comprising a colloidal overbased amorphous alkaline earth metal sulphonate and a suitable polymer is capable of giving improved protection to metal and other vulnerable surfaces.

In a first aspect, the present invention provides a composition comprising (a) a thermoplastic elastomer block copolymer,
(b) an amorphous overbased sulphonate of an alkaline earth metal or magnesium,
(c) a tackifier resin and, optionally,
(d) a plasticizer for component (a).

The invention also provides the use of a composition as defined above as an anticorrosion coating, and a substrate subject to corrosion or mechanical damage having a layer of a composition as defined above on a surface thereof.

The composition as defined above is advantageously applied as a liquid to a substrate Lo be protected, preferably in the form of a dispersion, or as a hot melt. At least when the composition is applied as a colloidal dispersion, component (b) of the composition is advantageously in colloidal form, the particle size preferably being at most 100A. The tackifier resin (c) is advantageously a liquid at room temperature. When the composition is applied in the form of a colloidal dispersion, the solvent is advantageously one in which at least one component block of component (a) is soluble.

Accordingly, the invention also provides a composition comprising (a) a thermoplastic elastomeric block copolymer,
(b) a colloidal amorphous overbased sulphonate of an alkaline earth metal or magnesium,
(c) a liquid tackifier resin,
(d) a plasticizer for component (a) and
(e) a solvent in which at least one component block of component (a) is soluble.

As examples of appropriate block copolymers for use as component (a), there may be mentioned a block copolymer containing units derivable from a vinyl aromatic monomer and (i) an aliphatic conjugated diene
(ii) an α-olefin, or
(iii) ethylene and an α-olefin, the α-olefin, and in (iii) the α-olefin and proportion of α-olefin, being chosen so that the resulting block confers elastomeric properties on the total polymer. An appropriate α-olefin for (ii) is isobutylene; for (iii) ethylene and a butylene or propylene are suitable. Polymers referred to as styrene-butylene-styrene or styrene-ethylene/butylene-styrene may be obtained by hydrogenation of styrene-diene-styrene polymers.

Although the vinyl monomer from which the copolymer is derived may be a vinyl di- or higher polyaromatic compound, e.g., vinyl naphthalene, it is preferably a vinyl monoaromatic compound, e.g., a styrene, for example, styrene itself, or a methylstyrene or a tert-butylstyrene, styrene itself being preferred. Examples of conjugated dienes include 1,3-pentadiene, 2,3-dimethyl-1,3-butadiene, chloroprene, isoprene and 1,3-butadiene, isoprene and 1,3-butadiene being preferred.

The normal block copolymers of vinyl aromatic and conjugated dienes advantageously have a total of from 2 to 5, and preferably 2 or 3, polymer blocks of the vinyl aromatic monomer and the conjugated diene with at least one polymer block of said vinyl aromatic monomer and at least one polymer block of said conjugated diene being present. The conjugated diene block is advantageously hydrogenated. The normal block copolymers may be linear or branched block copolymers, with the number of units in each block sufficient for the block copolymer to exhibit the inherent physical properties of the polymer, glass transition temperature and polymer melt temperature.

The vinyl aromatic monomer content is advantageously in the range of from 20 percent to 70 percent, preferably from 40 percent to 60 percent, by weight.

The block copolymers may be made by methods well known in the art or described in the literature, e.g., by anionic polymerization using, for example, an alkali metal hydrocarbon (e.g., sec-butyl lithium) as a polymerization catalyst. Methods for preparing the block copolymers are described in U.S. Pat. Nos. 3,763,044 and 3,772,196, the disclosures of which are incorporated by reference herein.

Examples of suitable, commercially available, block copolymers derived from styrene and butadiene include Shellvis-40, Shellvis-50 and Cariflex KX138S, the latter having an Mn about 55000, Mw about 73000, and a butadiene content of about 40%, while suitable styrene-ethylene/butylene-styrene copolymers include Kraton G1652 (Shellvis, Cariflex, and Kraton are trade marks).

When the block polymer is derived from a conjugated diene, it is advantageously hydrogenated to remove virtually all of the remaining olefinic double bonds, as described, for example, in U.S. Pat. Nos. 3,113,986 and 3,205,278, the disclosures of which are incorporated herein by reference. Briefly, hydrogenation is accomplished by contacting the copolymers with hydrogen at super-atmospheric pressures in the presence of a metal catalyst, for example, an organo-transition metal catalyst and a trialkyl aluminum compound.

In general, it is preferred that the block copolymers contain no more than 5% and preferably no more than about 0.5% residual olefinic unsaturation based on the total number of carbon-to-carbon covalent linkages within the molecule. Most preferably, these copolymers contain no discernible unsaturation, to ensure good oxidative stability.

In component (b), the alkaline earth metal is advantageously calcium and, for simplicity of description, the preparation and properties of component (b) will be described with reference to the calcium salt, although overbased magnesium sulphonates may also be used, either alone or in admixture with a calcium salt. Magnesium based compositions have especial utility where the treated surface is exposed to acidic atmospheres, although compositions based on magnesium alone are not so suitable where abrasion resistance is important. Zinc salts may also be used in admixture with calcium and/or magnesium. The term "overbased" is descriptive of compositions containing an excess of metal over that stoichiometrically required to neutralize the acid dispersing agent, in the present case a sulphonic acid.

Many processes for preparing dispersions of calcium salts involve carbonation of calcium oxide, hydroxide or alkoxide in an organic solvent in the presence of a sulphonic acid or other dispersant and, although carbonate is the predominant anion in the product, the original anions may remain. Calcium carbonate exists in various forms, and it has been found that, for the composition to have the desired properties, component (b) should be substantially free of calcite and vaterite as determined by infra-red analysis (calcite 884 cm$^{-1}$;

vaterite 879 cm$^{-1}$), and show a strong absorbance st 860 cm$^{-1}$ (amorphous).

The particle size of the overbased calcium sulphonate is advantageously at most 100 A, and is preferably in the range 25 to 75 A, most preferably about 50 A, the values including the core and surrounding sulphonate layer. Processes for the preparation of material of appropriate properties and particle size are described in European Patent Application No. 405879, the disclosure of which is incorporated by reference herein, and a preferred process will be described in more detail in Example A below.

A preferred process comprises forming a substantially mineral oil free mixture of a sulphonic acid and/or an alkaline earth metal sulphonate, a hydrocarbon solvent, an alcohol containing from 1 to 5 carbon atoms and an excess, relative to the acid, of calcium hydroxide or calcium oxide and water, carbonating the mixture at a temperature of at most 60° C., and advantageously of at most 35° C., removing the residual alcohol, optionally adding the medium, other than oil, in which it is desired to obtain the basic calcium sulphonate, removing the hydrocarbon solvent and optionally removing any water present.

The term "sulphonic acid or sulphonate", as used herein, refers generally to those sulphonates wherein the hydrocarbon portion of the molecule has a molecular weight in the range of about 300 to about 1,200. Preferably, for calcium sulphonate, this molecular weight is in the range of about 900 to about 1,100. These sulphonic acids or sulphonates may be either synthetic sulphonates or the so-called mahogany or natural sulphonates. The term "synthetic sulphonates" refers to those sulphonates which are derived from sulphonation feedstocks which are prepared synthetically. The synthetic sulphonates include alkyl sulphonates and alkaryl sulphonates. The alkaryl radical may be derived from benzene, toluene, ethyl benzene, xylene isomers, or naphthalene. Preferably, the alkyl groups are branched chain. Mixtures of sulphonates derived from alkaryl hydrocarbons having straight-chain alkyl groups and alkaryl hydrocarbons having branched-chain alkyl groups are particularly useful.

An examples of still another synthetic alkaryl sulphonate, which is particularly useful for preparing colloidal dispersions, is the sulphonate derived from a sulphonation feedstock known as "NAB Bottoms". NAB Bottoms are predominantly di-n-alkyl, wherein the alkyl groups contain from eight to 18 carbon atoms. They are distinguished from the preceding sulphonation feedstocks primarily in that they are straight-chain and contain a large amount of di-substituted material.

Other sulphonates which may be used include, for example, mono- and poly-wax substituted naphthalene sulphonates, dinonyl naphthalene sulphonates, naphthalene disulphide sulphonates, dicetyl thianthrene sulphonates, dilauryl β-naphthol sulphonates, unsaturated paraffin wax sulphonates, hydroxy substituted paraffin wax sulphonates, cyclo-aliphatic sulphonates, such as laurylcyclohexyl sulphonates, and mono- and poly-wax substituted cyclohexyl sulphonates.

Carbonation of the sulphonate is generally carried out until absorption of at least about 80%, and advantageously at most about 90%, preferably from 85 to 90%, of the stoichiometric quantity of CO$_2$ needed to convert all calcium hydroxide to carbonate; by this control, an amorphous colloid is obtained. The amorphous nature of the carbonate contributes to the fluidity at low temperature of the dispersion and also to adhesion to metal coatings of the polymer-containing composition.

As tackifier resin, component (c), there is advantageously used a resin having a glass transition point in the range $-10°$ C. to $-40°$ C., more especially from $-15°$ C. to $-25°$ C., and preferably about $-20°$ C. Advantageously, as indicated above, the resin is liquid at room temperature; a resin with a softening point about 20° C. is especially suitable. Suitable resins are petroleum hydrocarbon resins obtainable by the polymerization of a petroleum feed comprising aliphatic olefins having, for example, 5 to 9, especially 5 or 6, carbon atoms and a monovinyl aromatic compound, using a Friedal-Crafts catalyst and, if desired, a reactive olefinic chain transfer agent. Among preferred procedures for manufacture of the resin are those described in European Patent Application No. 272017, the disclosure of which is incorporated by reference herein. Resins derived from piperylene (CH$_2$=CHCH=CHCH$_3$) and a monovinyl aromatic hydrocarbon, especially styrene, are preferred. More especially there is employed a petroleum hydrocarbon resin having a softening point of from 0° to $-40°$ C., number average molecular weight, Mn, of from 100 to 900, Gardner colour of 6 or less, and a piperylene-derived content of from 5 to 50 weight percent, and a styrene-derived content of 10 to 30 weight percent, said resin being prepared by the aluminium chloride catalysed Friedel-Crafts polymerization of a hydrocarbon feed comprising:

(a) from 10 to 30 weight percent of a vinyl aromatic hydrocarbon,
(b) at least one diolefin, and
(c) piperylene.

More especially, the resin comprises from 5 to 40 weight percent of units derived from piperylene and from 10 to 30, advantageously about 15 weight percent styrene, and has a softening point of from 15° to 30° C., a Gardner colour of 3 or less, a number average molecular weight Mn of from 400 to 700, and a molecular weight distribution of at most 1.35.

A piperylene/styrene resin with Mn about 490, and Mw about 580, with a molecular weight distribution of about 1.2 is especially preferred, such a resin being available under the trade mark Escorez 2520.

The resin may be hydrogenated; at present, however, a non-hydrogenated resin is preferred.

As component (d), there may be mentioned aryl-substituted alkanes, more especially compounds comprising at least two aryl groups linked by a short alkyl chain, advantageously diaryl substituted alkanes, for example, ethane or butane. There may preferably be used 1-phenyl-1-tetrahydronaphthyl ethane (PTE), preferably the β-linked isomer, or an alkyl substituted derivative thereof or diphenyl butane, or mixtures thereof, or compounds of the formula

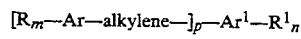

wherein R and R$^1$, which may be the same or different, are as defined above or cycloalkyl, Ar and Ar$^1$, which may be the same or different, represent a benzene, di or other polyphenyl or naphthalene ring, "alkylene" represents an alkylene radical having at least two carbon atoms, and m, n and p, which may be the same or different, each represent a whole number up to 5.

As component (e), the solvent, there is advantageously used a hydrocarbon solvent, especially an aromatic solvent, which solvates the aromatic segments of the block copolymer, or a solvent for the elastomeric component, e.g., a hydrogen bonding solvent, e.g. a ketone solvent. Preferably a mixture of such solvents is used.

As hydrocarbon solvents, there may be mentioned hexane, heptane, mixtures of straight chain alkanes with from 5 to 15 carbon atoms, branched chain alkanes, e.g., isohexane, and hydrogenated naphthalenes, and EXXSOL D40. Among the preferred aromatic hydrocarbon solvents there may be mentioned toluene, xylene, and Solvesso 100. As ketonic solvent, there may be mentioned methyl isobutyl ketone (MIBK).

The solvent, or solvent mixture, solubilizes the vinyl aromatic (generally polystyrene) end blocks of the block copolymer, allowing complete dissolution of the polymer structure; on evaporation of solvent, the polystyrene domains reform, harden, and lock the rubber network (ethylenebutylene, etc) network in place, effecting a virtual, physical, crosslinking.

The proportion of solvent is chosen with a view to ensuring that the viscosity of the composition is appropriate for application by the chosen method. For example, for atomized or airless spraying, a viscosity in the range 10 to 1000, advantageously 15 to 500, and preferably 20 to 400, Pa s at 23° C., is appropriate.

If warm spraying is under consideration, at a few degrees below the flash point of the solvent, then similar viscosity ranges at the relevant temperature will be appropriate.

The compositions of the invention may be in the form of solutions containing greater than 60 wt. % solids, typically 65 to 80 wt. % solids, and these solutions may be applied by conventional techniques to provide effective anti-corrosion and chip protection for metals, and such a use is part of the present invention as are metals coated with the composition. In particular, it is found that effective coatings of a thickness as low as 200 μm may be produced.

In addition to the components mentioned above, the composition may also comprise fillers or pigments, for example calcium carbonate, titanium dioxide or, especially, carbon black or calcined china clay.

An especially useful composition may be formed by incorporating a relatively acidic carbon black into the composition at a level, for example, of up to 25 parts by weight per 100 parts of total solids. In this way, high concentrations of reinforcing filler may be incorporated without introducing structure into the composition that would interfere with Newtonian behaviour. Lampblack (Flammruss) 101, sold by Degussa, is a suitable carbon black for this purpose; it has a particle size about 95 nm, and BET surface area of 2 $m^2/g$, pH about 7.

Another especially useful composition is formed by incorporating calcined china clay in the composition. It has surprisingly been found that, possibly because of acid-base neutralization between the clay and the sulphonate, although the applicants do not wish to be bound by any theory, the resulting composition may form almost colourless transparent coatings despite a very high particulate content. Especially suitable calcined china clays are those substantially of particle size below 300 mesh (British Standard; 53 μm), with mean particle size 2 μm; pH 6.5, specific gravity 2.6, and a BET surface area of 85 $m^2/g$. A preferred such clay is Polestar 200R (trade mark) available from ECC International Inc.

Because of the small particle size of the overbased sulphonate in the invention, the product has a clear colour which makes it possible, where a paint is being formulated, to have a reduced pigment content.

The compositions of the invention have utility in the automotive industry, as anticorrosion coatings, e.g., underbody or interior body coatings, as well as outside that industry, e.g., as industrial and marine paints. The compositions of the invention have good adhesion to iron and steel surfaces, including zinc coated surfaces and surfaces bearing an electrodeposited coating of, e.g., epoxy, polyester, polyurethanes, or blends of two or more such materials.

In a second embodiment of the invention, there is provided a composition comprising a thermoplastic elastomeric block copolymer and a diaryl-substituted alkane plasticizer. The invention also provides the use of such a composition as a corrosion-inhibiting coating, and a substrate subject to corrosion having a layer of such a composition on a surface thereof. Advantageously the composition also comprises a tackifier resin, or an overbased sulphonate, or both the tackifier resin and the sulphonate, the sulphonate preferably being an amorphous, Newtonian sulphonate of an alkaline earth metal or magnesium.

In a third embodiment of the invention, there is provided a composition comprising a thermoplastic elastomeric block copolymer and an amorphous overbased sulphonate of an alkaline earth metal or magnesium, the use of such a composition as a corrosion inhibiting coating, and a substrate subject to corrosion having a layer of such a composition on a surface thereof Advantageously, the composition also comprises a tackifier resin or a plasticizer for the copolymer, or both such a resin and plasticizer The following numbered examples illustrate the invention. Example A illustrates a preferred method of preparing the basic calcium sulphonate.

EXAMPLE A

To a stirred mixture of 276 g of calcium oxide in 585 g of toluene, there is added 494 g of an alkyl (alkyl chain - a mixture of about 75% $C_{24}$ branched and 25% $C_{18}$ linear alkyl groups) benzene sulphonic acid over a period of 0.5 hours at room temperature. To this mixture, there are added 585 g of methanol and 17.5 g of water. The mixture is then blown with 126 g of carbon dioxide for 4 hours at a temperature close to 28° C. The mixture is then heated to 68° C. over 2.5 hours to complete the reaction and remove methanol, before adding 200 g of EXXSOL D 40, an aliphatic hydrocarbon solvent. The resulting mixture is heated to 140°–150° C. for one hour to remove toluene and water before filtration.

The resulting product is a solution of basic calcium sulphonate in EXXSOL D 40, which solution contains 80% of non-volatile materials, 14.5% calcium, and has a viscosity of 400 mPa s at 23° C., this viscosity being constant to ±10% under different shear rates as measured through the Brookfield viscosimeter, evidencing the Newtonian behaviour of the product. The product has ASTM D 1500 color of 8; a 25% by weight solution in toluene has a Gardner rating of 10 infra-red spectroscopy shows that the calcium carbonate dispersed in this product is amorphous. Light scattering techniques indicate that the colloid particle size is around 50 A.

This product by itself is capable of forming a continuous protective film on metal surfaces, the small size of its particles enabling it to cover all the micro asperities of the surface, the film being thermally stable up to 180°

C. The addition of a polymer supplies the required mechanical properties.

EXAMPLE 1

Into a blade mixer were charged 12 parts of Kraton G-1652 (SEBS) and 306 parts of Escorez 2520, a piperylene-based resin, and the mix heated to 150° C. with stirring for 40 minutes. The mix was transformed to a stainless steel vessel equipped with paddle mixer and heating coils, and blended for a further 40 minutes at 145° C. Maintaining the temperature at 145° C., 15 parts of sulphonate produced in accordance with Example A were then added with stirring for a further 40 minutes, then 17 parts of Solvesso 100 were added, and stirring continued for 10 minutes more. The temperature was reduced to 40° C. 17 parts of MIBK were added, and the mixture stirred for a final 10 minutes before discharge.

At 23° C., the composition had a Brookfield viscosity (No. 6 spindle at 20 rpm) of 355 poise. Unless indicated to the contrary, all references to Brookfield viscosity are to measurements under these conditions.

Films were applied by bar coater to phosphatized and electrocoated panels at film thicknesses of 725 μm and 875 μm and air dried for 10 days at room temperature. The panels were then cooled to −40° C., equilibrated for 15 hours, and tested for resistance to chipping in a gravelometer in accordance with the procedure set out in ASTM D-3170, scored according to GME 60268 (General Motors Engineering Standard, Europe, Test Method GME 60268, issued June, 1986). In this test, which was modified to use small (9 mm) granite chips, a panel is bombarded with gravel under controlled conditions, the impacted panel surface evaluated visually and rated on a scale of 1 to 10 of which selected ratings are:

1. Very bad.
5. Mediocre.
6. Acceptable.
7. Satisfactory.
8. Very good.
10. Excellent.

In the test, the thinner film scored 5, the thicker 7.

EXAMPLE 2 and 3

The following formulations were prepared using the procedure of Example 1, but including a plasticizer, Actrel 400, the Actrel 400 being added after the Escorez 2520 in the Z blade mixer:

| Component | Parts by Weight | |
| --- | --- | --- |
|  | Ex. 2 | Ex. 3 |
| Product of Example A | 15 | 15.0 |
| Kraton G-1652 | 20.4 | 20.4 |
| Escorez 2520 | 30.3 | 27.5 |
| Actrel 400 (PTE) | 0.3 | 3.1 |
| Solvesso 100 | 17.0 | 17.0 |
| MIBK | 17.0 | 17.0 |
| Brookfield Viscosity, Poise | 262 | 227 |

Films were applied at the thicknesses shown below, dried and tested as in Example 1.

| | Thickness, μm | Score |
| --- | --- | --- |
| Example 2 | 887 | 9 |
| Example 2 | 1054 | 9 |
| Example 3 | 735 | 7 |
| Example 3 | 1068 | 8 |

The impacted 735 μm film from Example 3 was immersed in water at 55° C. for 7 days, dried at room temperature for 10 days, and tested again in the gravelometer at −40° C. and its performance compared with a pvc coating, applied as a plastisol, of similar thickness subjected to the same tests. After the immersion stage, the samples were tested according to ASTM D-1654 for resistance to corrosion spread while immersed. In ASTM D-1654, the spread of corrosion from a mark inscribed through the coating is noted, and rated on a scale of 1 to 10, of which the following relevant ratings are:

1. Over 16 mm.
5. From 3 to 5 mm.
7. From 1 to 2 mm.
8. From 0.5 to 1 min.
9. From 0 to 0.5 mm.
10. Zero.

The 735 μm film from Example 3 rated 10, the pvc film rated 7.

After the drying stage, the samples were tested for pull adhesion using the Zwick test. The force required to disbond the coating from the panel using a 3M898 Tape (Tensile Strength 710N/10 mm) was measured. The Example 3 coating required 23N, the pvc coating 7N. The Example 3 coating was again subjected to the gravelometer test at −40° C., two weeks after the pull adhesion test, and scored a rating of 10.

It was noticeable that, after the impacted test panels coated according to the invention had been returned to ambient temperature, the coating recovered toward its original smooth configuration and examination after the period of hot water immersion revealed no visible evidence of the original impacts.

EXAMPLE 4 and 5

In these examples, the Kraton G1652 elastomer (having a styrene percentage of 29% by weight) is replaced by Cariflex KX138S, having a styrene percentage of 40% by weight, making it a slightly harder resin (Shore A 90 vs 75 for Kraton) with a higher elongation at break (750%, vs 500%).

| Component | Example 4 | Example 5 |
| --- | --- | --- |
| Product of Example A | 15.0 | 15.03 |
| Cariflex KX138S | 23.1 | 25.33 |
| Escorez 2520 | 31.3 | 34.26 |
| Solvesso 100 | 13.6 | 10.79 |
| MIBK | 13.6 | 10.79 |
| Actrel 400 | 3.4 | 3.8 |
| Brookfield Viscosity, Poise | 150 | 300 |

The produces of Examples 1, 3 and 5 were coated at a dry thickness of 500 μm on electrodeposited steel panels, and compared with a 500 μm pvc coating for low temperature adhesion before water immersion, corrosion spread at a result of water immersion, and pull adhesion after immersion. The low temperature adhesion test was carried out according to ISO 1519-1973, at −40° C., the other tests as described above.

| Results | Example | | | |
|---|---|---|---|---|
| | 1 | 3 | 5 | PVC |
| Low Temperature Adhesion (ISO . . . , −40° C.) passes out of 3 | 3 | 3 | 3 | 3 |
| Corrosion Spread, Rating | 9 | 10 | 10 | 8 |
| Pull Adhesion, N | >25 | >20 | >25 | >7 |

A hot melt sample of the Example 5 formulation may be prepared by blending the Cariflex, Actrel, and Escorez in a Z blade mixer, and adding the sulphonate with stirring at 145° C., evaporating the sulphonate solvent to produce a hot melt.

EXAMPLE 6 to 10

These examples illustrate the inclusion of a filler in a composition of the invention. The fillers used were Polestar 200R, a calcined china clay whose properties are given above, and Flammruss 101, carbon black.

| | Example No. Parts by Weight | | | | |
|---|---|---|---|---|---|
| | 6 | 7 | 8 | 9 | 10 |
| Product of Example A | 13.6 | 12.5 | 11.6 | 10.8 | 13.4 |
| Cariflex KX139S (SEBS) | 23.1 | 21.1 | 19.5 | 18.1 | 22.7 |
| Escorez 2520 | 31.1 | 28.5 | 26.3 | 24.4 | 30.5 |
| Actrel 400 | 3.5 | 3.2 | 3.0 | 2.8 | 3.5 |
| Solvesso 100 | 9.8 | 9.0 | 8.3 | 7.7 | 9.6 |
| MIBK | 9.8 | 9.0 | 8.3 | 7.7 | 9.6 |
| Polestar 200R | 9.1 | 16.7 | 23.0 | 28.5 | — |
| Flammruss,101 | — | — | — | — | 10.7 |

The china clay and carbon were each ball milled for 15 hours before being blended into the remaining ingredients of the formulations, which had been pre-blended in accordance with the procedures of the previous Examples. After blending of the calcined china clay into the formulation, the composition was observed to have taken on a green hue. On application to phosphatized metal plates, the clay filled coatings were transparent even at film thicknesses greater than 500 μm. Light transmission tests carried out on the product of Example 5 loaded with 10 to 40 parts of Polestar 200R per 100 parts of the Example 5 formulation showed light transmissions ranging from 94% to 72% of that of glass.

The properties of the formulations of Examples 6 to 10 and the results of tests carried out on electrodeposited panels coated with the formulations are shown below.

| Property | | Example No. | | | | |
|---|---|---|---|---|---|---|
| | | 6 | 7 | 8 | 9 | 10 |
| Solids content, % by weight | | 77.5 | 79.5 | 80.9 | 82.3 | 78 |
| Brookfield Viscosity | | 489 | 545 | 620 | 1500 | 1020 |
| Vertical Flow, dry film thickness/maximum temperature pass (°C.) | 200 μm | 140 | 120 | 140 | 140 | 140 |
| | 400 μm | 100 | 100 | 100 | 100 | 100 |
| | 600 μm | 80 | 80 | 80 | 80 | 80 |
| Gravelometer, 22° C. GM score/film | | | | | | |

| Property | | Example No. | | | | |
|---|---|---|---|---|---|---|
| | | 6 | 7 | 8 | 9 | 10 |
| thickness (μm) | 6 | — | 216 | 500 | — | — |
| | 7 | 402 | — | — | — | 214 |
| | 8 | 502 | 524 | 800 | — | — |
| | 9 | — | 722 | — | 678 | 642 |
| | 10 | — | 1030 | 1100 | — | — |
| Gravelometer, −40° C. GM score/ dry film thickness (μm) | 6 | | | | 251 | 283 |
| | 8 | | | | 525 | 468 |
| | 10 | | | | 962 | 956 |

EXAMPLE 11

A hot-melt formulation was prepared as follows: Components were charged into a Z blade mixer, in the order stated, in the proportions given for the non-volatile components of Example 9: Escorez 2520; Cariflex KX139S; Product of Example A; Actrel 400; Polestar 200R. Mixing conditions were: Rotation speed: 10 RPM; time: 2 hours; Initial Temperature 100° C.; Final Temperature 150° C.

The resulting product had a viscosity of 670 poise at 120° C.; 360 poise at 150° C., and 175 poise at 170° C., and could readily be applied as a hot melt coating.

What I claim is:
1. A composition comprising
   (a) a thermoplastic elastomer block copolymer,
   (b) an amorphous overbased sulphonate of an alkaline earth metal,
   (c) a tackifier resin and, optionally,
   (d) a plasticizer for component (a).
2. A composition as claimed in claim 1, in which component (a) is a styrene-butadiene-styrene block copolymer.
3. A composition as claimed in claim 1, in which component (a) is a styrene-ethylene-butylene-styrene block copolymer.
4. A composition as claimed in claim 1 or claim 2, wherein component (a) is hydrogenated.
5. A composition as claimed in claim 4 wherein component (b) is an overbased calcium sulphonate.
6. A composition as claimed in claim 5, wherein component (b) has a particle size of at most 100 A.
7. A composition as claimed in claim 6, wherein component (c) has a glass transition point in the range of from −10° C. to −40° C.
8. A composition as claimed in claim 7, wherein component (c) is liquid at room temperature.
9. A composition as claimed in claim 8, wherein component (c) is derived from piperylene and a chain transfer agent.
10. A composition as claimed in claim 9, wherein component (d) is present and is 1-phenyl-1-tetrahydronaphthyl ethane.
11. A composition as claimed in claim 1 which also comprises a filler.
12. A composition as claimed in claim 11, wherein the filler is a calcined china clay or a carbon black.
13. A substrate subject to corrosion or mechanical damage having a layer of a composition as claimed in claim 1 on a surface thereof.

14. A composition comprising a substantially saturated thermoplastic elastomeric block copolymer and a diaryl-substituted alkane plasticizer.

15. A composition as claimed in claim 14, wherein the block copolymer is as specified in claims 2 or 3.

16. A composition as claimed in claim 14 wherein the plasticizer is as specified in claim 10.

17. A substrate subject to corrosion having a layer of a composition as claimed in claim 1 on a surface thereof.

18. A composition comprising a thermoplastic elastomeric block copolymer and an amorphous overbased sulphonate of an alkaline earth metal.

19. A composition as claimed in claim 18, wherein the copolymer is as specified in claims 2 or 3.

20. A composition as claimed in claim 18, wherein the sulphonate is as specified in claim 5 or claim 6.

21. A substrate subject to corrosion having a layer of a composition as claimed in claim 18, on a surface thereof.

22. The composition of claim 1 wherein the alkaline earth metal is magnesium.

23. The composition of claim 18 wherein the alkaline earth metal is magnesium.

* * * * *